Sept. 23, 1958  R. L. MIGHELL  2,852,994
ANGLE ADJUSTING MEANS FOR PLOWS
Filed July 28, 1954  2 Sheets-Sheet 1

INVENTOR
RUSSELL L. MIGHELL
BY
Emerson B Donnell
ATTORNEY

Sept. 23, 1958 R. L. MIGHELL 2,852,994
ANGLE ADJUSTING MEANS FOR PLOWS
Filed July 28, 1954 2 Sheets-Sheet 2
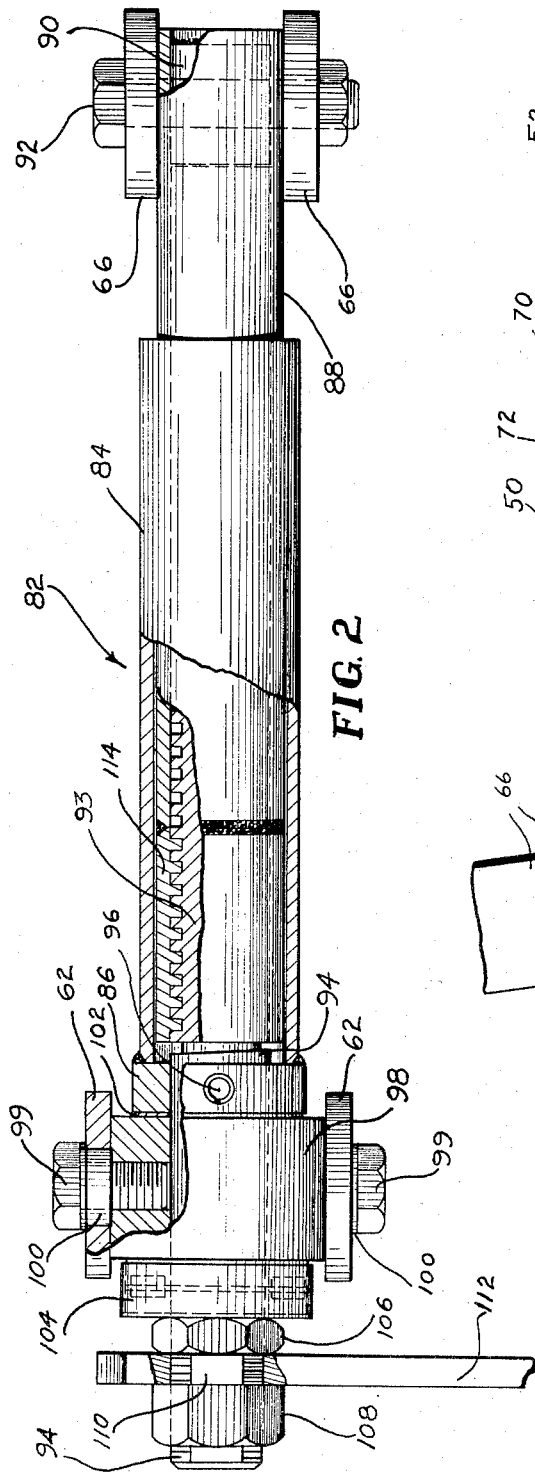
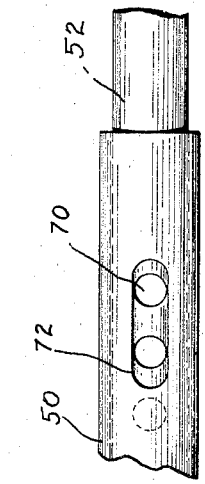
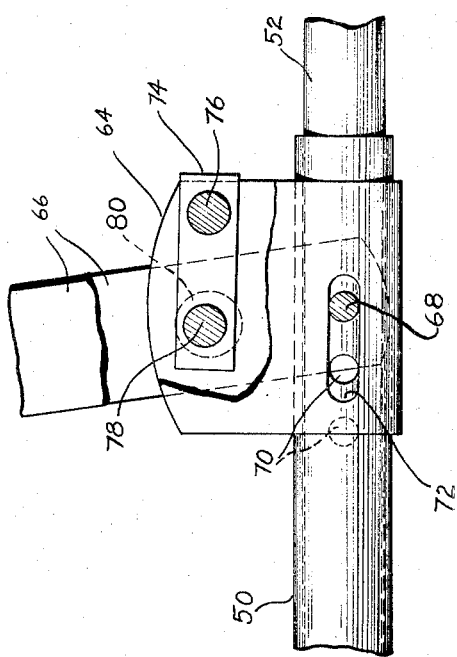
INVENTOR
RUSSELL L. MIGHELL
BY
Emerson B Donnell
ATTORNEY

United States Patent Office 2,852,994
Patented Sept. 23, 1958

2,852,994

ANGLE ADJUSTING MEANS FOR PLOWS

Russell L. Mighell, Kewanee, Ill., assignor to J. I. Case Company, Racine, Wis., a corporation of Wisconsin Application July 28, 1954, Serial No. 446,353

10 Claims. (Cl. 97—47.5)

This invention relates to a tractor mounted plow and especially to means for adjusting the angle of the plow shares relatively to the plane of traverse of the tractor.

This arrangement is especially adaptable to tractors having rearwardly extending draft arms and an upwardly spaced link which has adjusting means whereby the plow bottoms can be adjusted relatively to the plane of travel of the tractor.

The above plow arrangement also includes a mast and a rearward and downward extending member which serves to support the plow from the mast. The present invention is an auxiliary adjustment which is more conveniently located for the benefit of the operator than that in the usual upwardly spaced link.

An object of this invention is to provide an auxiliary means for adjusting the plow bottoms relating to the plane of travel.

Another object is to provide an adjustment which has an increased mechanical advantage or leverage.

Another object is to provide finer adjustment than that presently available.

Another object is to provide an adjustment means that can be easily operated from the tractor seat.

Another object is to provide an easily and accurately adjustable extensible link or strut.

Referring to the drawings,

Fig. 2 is an enlarged fragmentary plan view of Fig. 1 taken at 2—2;

Fig. 3 is an enlarged fragmentary side view of a portion of Fig. 1 partly in section; and, Fig. 4 is a fragmentary detail of Fig. 3.

Figure 1:
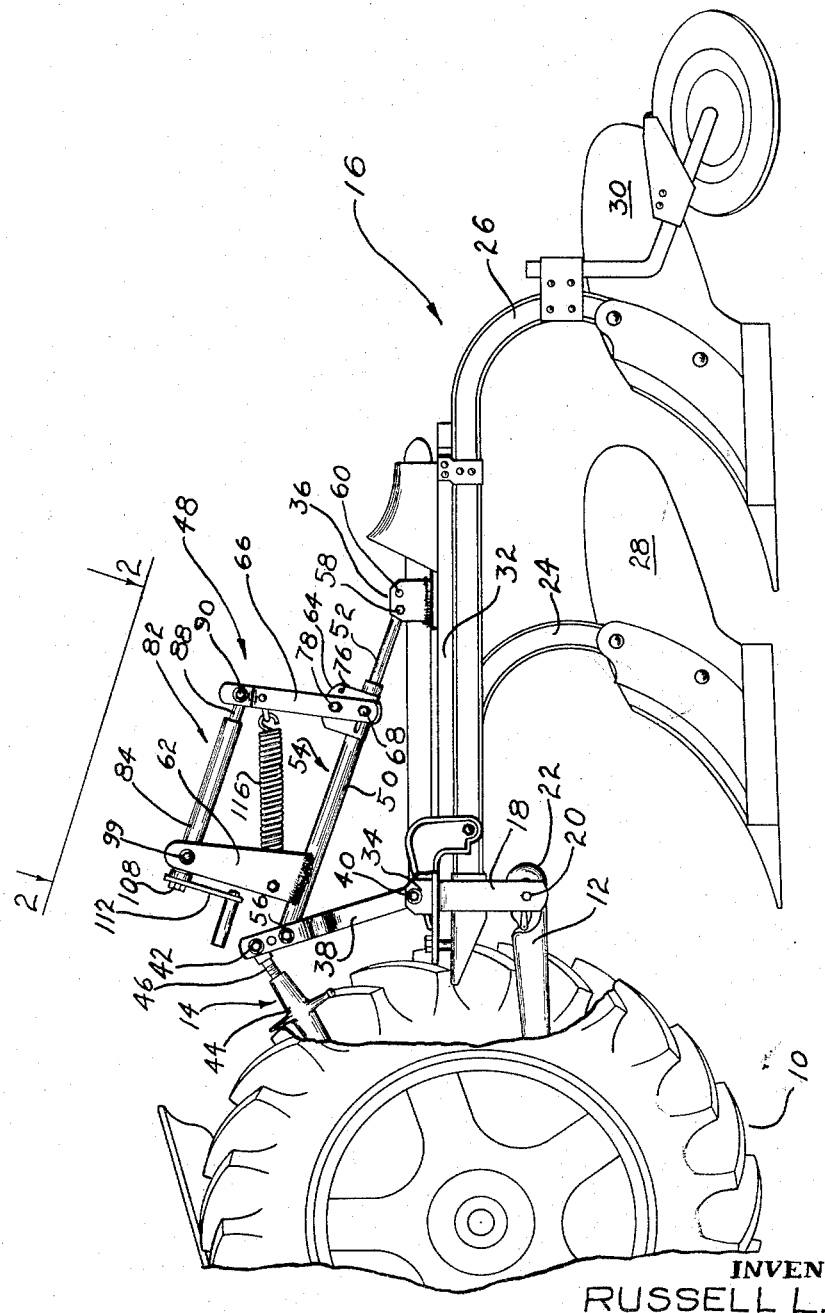
Fig. 1 is a side elevational view of a plow attached to a tractor, only a fragmentary portion of the tractor being shown.

Referring to the drawings, 10 is a tractor having rearwardly-extending draft arms 12, only one of which is shown. A link 14, also pivoted to the tractor, serves to support the implement for lifting and also to provide a depth adjustment.

In this instance a two-bottom plow 16 is shown which is provided with a transverse drawbar 18 and which is provided with draft pins 20 that are engaged by the jaws 22 of the draft arms 12. A portion of plow beams 24 and 26 in this instance is secured to drawbar 18 and carries plow bottoms 28 and 30. The plow shown is of the breakaway type, but as the invention is not concerned with the plow specifically, details will be referred to only when necessary in order to explain the invention.

Plow 16 is provided with a frame 32 to which is secured a forward bracket 34 and a rearward bracket 36. A bifurcated mast 38 is pivoted in forward bracket 34 by bolts 40 only one of which is shown. The upper end of mast 38 is pivoted to link 14 by a bolt 42.

Link 14 is similar to a turn buckle having a nut portion 44 and a left hand screw at one end and a right hand screw 46 at the other.

The adjusting means 48 comprises a pair of tubular telescopic members, an outer member 50, and an inner member 52, the latter made to slide freely within the outer member 50. When members 50 and 52 are assembled as shown in Fig. 1, they form a diagonal member 54. The upper end of member 50 is pivoted to mast 38 by a bolt 56 and the free end of member 52 is pivoted to bracket 36 by a bolt 58 in a suitable hole. Similar holes such as 60 are provided in bracket 36 for adjustment to accommodate extreme positions of the plow and to compensate for variations in the implement.

A bifurcated standard 62, as shown in Figs. 1 and 2 is welded or otherwise secured to the outer member 50, and in this instance extending laterally as shown. A bifurcated bracket 64, is secured by welding or otherwise fastened to member 50 at a point spaced from standard 62 as shown in Figs. 1 and 2. A bifurcated lever 66 is located with one bifurcation adjacent each face of bracket 64 and is provided with a fulcrum pin 68. A series of holes 70 are provided in member 52 in order to provide a range of adjustment to compensate for extreme variations in the implement and the mountings. Elongated slot 72 as shown in Figs. 1, 3 and 4 is provided through outer member 50 and bracket 64 of a width to freely accommodate pin 68. Slot 72 is of a length sufficient to permit pin 68 to travel the desired amount to obtain the full range of adjustment.

A link 74 is positioned intermediate the bifurcations of bracket 64 as shown in Fig. 3, and is provided with a pivot pin 76 which is anchored in bracket 64. Spaced from pin 76 is a pin 78 which extends through both bifurcations of lever 66 and which provides the fulcrum for the lever. However it will be clear from an inspection of Figs. 1 and 3 that pin 78 will move toward or away from the axis of members 50 and 52 when lever 66 is pivoted about pin 78. To prevent interference because of this movement of pin 78, holes 80 in bifurcated bracket 64 are considerably larger than pin 78.

A screw-and-nut arrangement 82 provides the means of telescoping member 52 within member 50 so as to obtain the desired adjustment from the operator's seat.

Arrangement 82 comprises an outer protecting and support sleeve 84 which has a collar 86 welded or otherwise secured thereto. An inner sleeve 88 is pivotally secured between the bifurcations of lever 66 and is of a diameter to permit it to telescope freely within outer sleeve 84. A plug 90 closes the end of sleeve 88 against dirt and a bolt 92 provides the pivot means for inner sleeve 88 and also holds plug 90 in place.

Screw member 93 has a major diameter to permit it to freely enter sleeve 88 and which screw extends through sleeve 88 and at one extremity of its travel contacts plug 90, the latter acting as a stop. A portion of reduced diameter 94 is provided on screw 93 and which passes through a hole in collar 86. A pin 96 is passed through collar 86 and portion 94 of screw 93 thus securing the screw and the outer sleeve 84 together integrally.

Portion 94 of screw 93 is of a substantial length for reasons which will appear. Portion 94 is journaled in a trunnion 98 which is installed between the bifurcations of standard 62 as shown in Fig. 2. Trunnion 98 is supported by two screws which are threaded diametrically into the trunnion 98. Bushings 100 having a length slightly in excess of the thickness of the bifurcations of standard 62 are provided and which have shoulders against which the heads of the screws 99 abut. Thus is provided a trunnion which can rotate freely about bushings 100 in the standard 62.

A thrust washer 102 is inserted between collar 86 and trunnion 98. A commercial type thrust roller bearing 104 is provided on the axially-opposed side of trunnion 98 in order to meet the thrust when angling the plow bottoms upwardly. Portion 94 of screw 93 is threaded so as to accommodate a pair of nuts 106 and 108. Nut 106 is placed adjacent to bearing 104 and is employed to adjust the end play of portion 94 within trunnion block 98. Portion 94 of screw 93 is provided with diametrically positioned flat portions 110 only one of which is shown, these flat portions cooperating with a rectangular hole in a crank handle 112 so as to prevent the handle from turning relative to the screw 93. When handle 112 has been assembled on screw 93, nut 108 is tightened.

A nut 114 of an outside diameter corresponding to that of sleeve 88 is secured axially to the latter by welding or any other well known means of fastening.

An assisting spring member 116 is anchored between standard 62 and lever 66 and which aids the operator in turning handle 112 and when it is desired to raise the points of the plow upwardly, the preponderant thrust in this arrangement being in the direction opposed to the spring.

It is clear that when a tractor operator wishes to adjust the angle of the plow bottoms 28 and 30 either up or down, it is necessary to merely turn the crank handle 112, and the adjustment is thereby made with a minimum of effort owing to the mechanical advantage gained by the screw and nut and the additional advantage gained by the leverage of lever 66.

The same advantages are present when the device is used as an extensible link for general purposes.

Various modes of carrying out the invention may be employed within the scope of the accompanying claims, which particularly point out and distinctly set forth the subject matter regarded as the invention.

I claim:

1. A tractor mounted plow for use with a tractor having spaced rearwardly-extending draft arms and an upwardly and rearwardly directed compression link, said plow having a transverse drawbar pivotally supported by said draft arms, a frame, and a mast pivoted thereon and extending upwardly to pivot at the end of said compression link, in combination; a plow angle-adjusting means comprising a telescoping strut having an outer and inner member, said inner member being anchored to said frame and said outer member being anchored to said mast, a bifurcated standard fixed in relation to said outer member and extending laterally therefrom, a bifurcated bracket fixed in relation to said outer member and spaced from said standard, said bracket and said outer member being provided with a slot directed longitudinally of said outer member, an adjustment arm pivoted on said bracket at a point spaced laterally from said slot, means associated with said arm and passing through said slot to effect telescoping of said inner member upon movement of said arm, a screw-operated adjusting member spaced from said outer member, said adjusting member comprising an outer sleeve, and an inner telescopic sleeve, said inner sleeve being pivotally secured to said adjustment arm, a threaded nut secured to said inner sleeve, a screw member engaged with said nut, journal means on said screw and trunnioned in said standard, means to secure said outer sleeve for rotation with said screw and abutting one side of said journal means, a thrust bearing on the opposite side of said journal means and means to rotate said screw.

2. A tractor mounted plow for connection to a tractor having spaced rearwardly-extending draft arms and a rearwardly directed compression link, said plow having a frame pivotally supported by said draft arms, and a mast pivoted on said frame and pivoted to the end of said compression link; in combination, a plow angle-adjusting means comprising a telescoping member having an outer and inner member, said inner member being anchored to said frame and said outer member being anchored to said mast, a bifurcated standard secured to said outer member and extending laterally therefrom, a bifurcated bracket secured to said outer member and spaced from said standard, said bracket and said outer member being provided with a longitudinal slot, an adjustment arm pivoted on said bracket at a point spaced from said outer member, means passing through said slot and said inner member to effect axial shifting of the latter upon movement of said arm, a screw operated adjustment member spaced from said telescopic member, said screw adjustment member comprising an outer sleeve and an inner telescoping sleeve pivotally secured to said adjustment arm, a threaded nut secured to said inner sleeve, a screw member associated with said nut, journal means on said screw and trunnioned in said standard, means to secure said outer sleeve for rotation with said screw and abutting one side of said journal means, and means to rotate said screw to effect actuation of said adjustment member.

3. A tractor mounted plow for connection to a tractor having spaced rearwardly extending draft arms and a compression link, said plow having a frame pivotally supported by said draft arms and a mast pivoted on said frame and pivoted to the end of said compression link, in combination, a plow-angling means comprising a telescoping member having an outer and inner member, said inner member being pivoted to said beam, and said outer member being pivoted to said mast, a bifurcated standard integral with with said outer member, a bifurcated bracket integral with said outer member and spaced from said standard, said bracket and said outer member being provided with an aperture, an adjustment arm pivoted on said bracket adjacent said aperture, means passing through said aperture to pivotally secure said arm and said inner member together to effect axial shifting of the latter upon movement of said arm, an adjustment member comprising an outer sleeve, and an inner telescopic sleeve pivotally secured to said adjustment arm, a threaded nut secured to said inner sleeve, a screw member associated with said nut, journal means on said screw and trunnioned in said standard, means to secure said outer sleeve for rotation with said screw, and means to rotate said screw.

4. In a tractor having draft arms and an upwardly-spaced, rearwardly extending link for attachment to a plow having a rearwardly extending frame carried by said draft arms and an upwardly extending mast pivoted to said frame and connected to said link, in combination, means to adjust the angle of said plow relative to the plane of travel of said tractor comprising a first cylindrical member pivoted to said mast and a second cylindrical member telescopically associated with said first cylindrical member and pivotally secured to said frame, a lever pivoted to said first cylindrical member at a point spaced from the axis thereof and engaging said second cylindrical member for axial displacement of the latter upon swinging of said lever, a screw member pivoted against axial displacement on said first cylindrical member at a point adjacent said mast, a nut member associated with said screw and pivoted on said lever at a point spaced from the axes of said cylindrical members, and means secured to said screw for manual rotation.

5. In a tractor having draft arms and an upwardly spaced link for attachment to a plow having a rearwardly extending frame associated with said draft arms and an upwardly extending mast pivoted to said frame and to said link, in combination, means to adjust the angle of said plow relative to the plane of travel of said tractor, comprising a first telescoping member pivoted to said mast and a second telescoping member associated with said first member and pivotally secured to said frame, a lever pivoted to said first member and engaging said second member for axial displacement of the latter upon swinging of said lever, a screw element pivoted against axial displacement on said first member at a point adjacent said mast, a nut element associated with said screw element and connected to said lever at a point spaced from said first and second members, and means to effect manual rotation of one of said elements.

6. In a tractor having draft means and an upwardly-spaced link for attachment to a plow having a frame associated with said draft means and a mast secured on said frame and to said link, in combination, means to adjust the angle of said plow relative to the plane of travel of said tractor comprising external and internal telescoping members axially assembled intermediate said mast and said frame, a lever pivotally associated with said external member and engaging said internal member, a pair of threadedly-related members, one of which is anchored to said mast and the other anchored to said lever, and means to actuate said threadedly-related members to telescope said inner member relative to said outer member.

7. An extensible strut comprising the combination of first and second members telescopically related to each other, a lever fulcrumed on the first member and connected with the second member for telescopically moving said members upon rocking movement of said lever, a bracket mounted on and projecting substantially normal to said first member and mechanism including screw and nut elements supported from said bracket, extending in the same general direction as said members and connected with the lever for rocking the latter as a result of actuation of the mechanism by rotation of one of said elements.

8. An extensible strut comprising the combination of first and second members telescopically related to each other, a lever supported on one of said members and connected with the other member for telescopically moving said members upon rocking movement of said lever, a bracket projecting substantially normal to said one of said members and extensible mechanism connected with said lever and supported on said lever and bracket in a position substantially parallel to said telescopically related members for rocking the lever in response to extension and retraction of said mechanism.

9. An extensible strut comprising in combination, first and second members telescopically related to each other, a lever fulcrumed on the first member substantially normal thereto and connected with the second member for telescopically moving said second member upon rocking movement of said lever, a bracket projecting substantially normal to said first member and mechanism including telescoping screw and nut elements supported from said bracket and laterally spaced from said first and second members and substantially parallel thereto and connected with said lever for rocking the latter as a result of actuation of one of said screw and nut elements, and resilient means extending intermediate said bracket and said lever to urge the latter toward said bracket.

10. An extensible strut comprising the combination of first and second members telescopically related to each other, said first member being provided with a longitudinal slot, a lever extending substantially normal to said strut, means passing through said slot engaging said second member and pivoted to said lever, link means pivoted to said first member, and to said lever at a point spaced laterally from said slot, a bracket spaced axially from said lever and secured to said first member, and extensible means extending between said lever and said bracket for rocking the lever in response to actuation of said extensible means.

References Cited in the file of this patent

UNITED STATES PATENTS

| | | |
|---|---|---|
| 602,262 | La France | Apr. 12, 1898 |
| 2,319,670 | Ego | May 18, 1943 |
| 2,456,693 | Fraga | Dec. 21, 1948 |
| 2,669,882 | Shaffer et al. | Feb. 23, 1954 |